US010677350B2

(12) United States Patent
Maurer et al.

(10) Patent No.: US 10,677,350 B2
(45) Date of Patent: Jun. 9, 2020

(54) METHOD OF CONTROLLING TRANSMISSION RANGE IN RESPONSE TO A LOSS OF COMMUNICATION WITH AN ENGINE AND SYSTEM THEREOF

(71) Applicant: ALLISON TRANSMISSION, INC., Indianapolis, IN (US)

(72) Inventors: Brent Maurer, Carmel, IN (US); Ryan Cummings, Indianapolis, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 16/168,191

(22) Filed: Oct. 23, 2018

(65) Prior Publication Data

US 2020/0124169 A1 Apr. 23, 2020

(51) Int. Cl.
*F16H 61/12* (2010.01)
*F16H 61/16* (2006.01)
*F16H 61/02* (2006.01)

(52) U.S. Cl.
CPC ......... *F16H 61/16* (2013.01); *F16H 61/0213* (2013.01); *F16H 61/12* (2013.01); *F16H 2061/1224* (2013.01); *F16H 2061/1256* (2013.01)

(58) Field of Classification Search
CPC ...... F16H 61/0213; F16H 61/12; F16H 61/16; F16H 2061/1208; F16H 2061/1224; F16H 2061/1232; F16H 2061/1268
See application file for complete search history.

(56) References Cited

U.S. PATENT DOCUMENTS

| | | | |
|---|---|---|---|
| 5,839,534 A | 11/1998 | Chakraborty et al. | |
| 6,559,764 B1 * | 5/2003 | Neuner | F16H 59/105 340/438 |
| 6,996,465 B2 | 2/2006 | Kim | |
| 7,349,479 B2 | 3/2008 | Suganuma et al. | |
| 7,617,027 B2 | 11/2009 | Jeong | |
| 7,993,242 B2 | 8/2011 | Bertsch et al. | |
| 8,437,930 B2 | 5/2013 | Park | |
| 9,239,108 B2 | 1/2016 | Ganter et al. | |
| 9,266,537 B1 | 2/2016 | Lee et al. | |

(Continued)

OTHER PUBLICATIONS

International Search Report, U.S. Patent Office, dated Dec. 26, 2019, pp. 1-9.

*Primary Examiner* — Edwin A Young
(74) *Attorney, Agent, or Firm* — Taft Stettinius & Hollister LLP; Stephen F. Rost

(57) ABSTRACT

A method of controlling a multispeed transmission includes providing a transmission controller, a plurality of ranges of the transmission of which at least one of the plurality of ranges is defined as a limiting range, and a communication link. The transmission is operated in a first range of the plurality of ranges and the method includes detecting a loss of communication over the communication link between the transmission controller and another controller. The method also includes determining if the first range is defined as the limiting range when communication is lost and commanding a shift from the first range to a second range of the plurality of ranges which is not defined as the limiting range. The method further includes controlling the shift from the first range to the second range.

20 Claims, 3 Drawing Sheets

(56) References Cited

U.S. PATENT DOCUMENTS

| | | |
|---|---|---|
| 9,822,825 B2 | 11/2017 | Essenmacher |
| 2003/0186782 A1 | 10/2003 | Genise |
| 2004/0238305 A1 | 12/2004 | Markyvech |
| 2008/0148827 A1 | 6/2008 | Keski-Hynnila et al. |
| 2013/0304310 A1 | 11/2013 | Inada et al. |
| 2015/0167615 A1 | 6/2015 | Komuro et al. |
| 2015/0204441 A1* | 7/2015 | Kinoshita ......... F16H 61/66259 701/62 |
| 2016/0053887 A1* | 2/2016 | Moorman ............... F16H 59/44 701/62 |
| 2017/0118230 A1 | 4/2017 | Wakita |
| 2017/0288951 A1 | 10/2017 | Kurauchi et al. |
| 2017/0334427 A1 | 11/2017 | Butcher et al. |

* cited by examiner

METHOD OF CONTROLLING TRANSMISSION RANGE IN RESPONSE TO A LOSS OF COMMUNICATION WITH AN ENGINE AND SYSTEM THEREOF

FIELD OF THE DISCLOSURE

The present disclosure relates to controlling a transmission, and in particular to a method of controlling transmission range in response to a loss of communication with an engine or other power-generating device.

BACKGROUND

In a conventional vehicle or work machine, an engine controller communicates with a transmission controller and other controllers over a communication link such as a Society of Automotive Engineers (SAE) J-1939 communications protocol. Communication may include information such as torque, speed, power, and the like. The communication over the link allows the controllers to optimally control the engine, transmission and any other device.

When a communication loss or interruption occurs, however, the controllers are unable to communication with one another. This can be problematic particularly if operating at a high torque or speed level, and an operator desires to change the operation of the vehicle or machine, e.g., shift into a different range. To protect the transmission and its internal components, the transmission controller may communicate certain torque level requirements to the engine controller to maintain engine torque at a certain level, for example. When the communication between controllers is either lost or intermittently interrupted, the controllers may not be able to communicate with one another. As a result, high or varying output torque from the engine can present problems to the transmission.

Thus, there is a need for a method and system to protect the transmission in the event of a loss of communication, whether intermittently or for a longer duration.

SUMMARY

In one embodiment of the present disclosure, a method of controlling a multispeed transmission includes providing a transmission controller, a plurality of ranges of the transmission of which at least one of the plurality of ranges is defined as a limiting range, and a communication link; operating the transmission in a first range of the plurality of ranges; detecting a loss of communication over the communication link between the transmission controller and another controller; determining if the first range is a limiting range; commanding by the transmission controller a shift from the first range to a second range of the plurality of ranges if the first range is a limiting range and the second range is a non-limiting range; and shifting the transmission from the first range to the second range.

In one non-limiting example of the present disclosure, the method includes preventing by the transmission controller a shift from any of the plurality of ranges not defined as the limiting range to the at least one of the plurality of ranges defined as the limiting range. In a second example, the method can include maintaining the transmission in first range if the first range is not a limiting range. In a third example, the method may include performing a skip shift by shifting from second range to a third range, where first range is between the second and third ranges.

In a fourth example of this embodiment, the method can include determining if there is a lower range to downshift to that is not a limiting range. In a fifth example, the method may include upshifting to a higher, non-limiting range when the first range is a limiting range and there is no lower, non-limiting range. In a sixth example, the method can also include upshifting or downshifting from first range to a non-limiting range based on a shift schedule when there is a lower, non-limiting range available to shift to. In a seventh example, the method can further include avoiding overspeeding an engine by upshifting based on the shift schedule.

In an eighth, non-limiting example of this embodiment, the method includes maintaining the transmission in a non-limiting range after the shifting step until communication is restored. In a ninth example, the method may include detecting communication between the transmission controller and the other controller via the communication link is restored; and resuming normal operation of the transmission.

In another example of this embodiment, the method includes shifting from the second range to the first range once normal operation resumes. In yet another example, the method may include detecting a timeout condition by the transmission controller when receiving a message via the communication link from the other controller; implementing a counter upon detecting the timeout condition; and triggering a diagnostic code if a number of samples detected via the implementing step exceeds a sample threshold.

In a further non-limiting example, the method may include enabling an algorithm to perform the determining step, commanding step and shifting step if the number of samples exceeds the sample threshold. In yet a further example, the method can include determining if a lockup clutch of the transmission is engaged after the detecting step. Moreover, the method may include shifting out of first range if the lockup clutch is not engaged; and controlling the transmission in first range or any of the plurality of ranges if the lockup clutch is engaged.

In another embodiment of the present disclosure, a method of controlling a multispeed transmission of a vehicle having an engine includes providing the transmission with a transmission controller for controlling the transmission, a lockup clutch, and a plurality of shiftable ranges, where each of the plurality of shiftable ranges comprises a torque limit; defining each of the plurality of shiftable ranges as either a limiting range or a non-limiting range based on its respective torque limit, where each limiting range has a lower torque limit than the non-limiting ranges; operating the transmission according to a shift schedule in a first range of the plurality of ranges, where the first range is defined as a limiting range; detecting a loss of communication over a communication link between the transmission controller and another controller; determining if the lockup clutch is engaged or disengaged; commanding by the transmission controller a shift from the first range to a second range, where the second range is defined as a non-limiting range; and controlling the transmission by the transmission controller to shift from the first range to the second range.

In one example of this embodiment, the method may include preventing by the transmission controller a shift from one of the non-limiting ranges to one of the limiting ranges until communication is restored. In another example, the method can include determining if there is a lower, non-limiting range to downshift the transmission; and upshifting to a higher, non-limiting range from the first range when there is no lower, non-limiting range. In a further example, the method can include upshifting or downshifting from first range to a non-limiting range based on the shift schedule when there is a lower, non-limiting range available to downshift to.

In a further embodiment of the present disclosure, a multispeed transmission includes a transmission having an input and an output, the input configured to be operably coupled to an engine; a plurality of shiftable ranges of the transmission, where each of the plurality of shiftable ranges comprises its own torque limit; and a transmission controller comprising a memory unit and a processor, the memory unit storing a shift schedule for operably controlling the transmission; wherein, each of the plurality of shiftable ranges is defined as either a limiting range or a non-limiting range based on its torque limit, where the torque limit of the limiting range is less than the torque limit of the non-limiting range; wherein, the transmission controller is configured to be disposed in electrical communication with an engine controller via a communication link; further wherein, a set of instructions are executable by the processor of the transmission controller to detect a loss of communication with the engine controller over the communication link; determine if a current operating range of the transmission is a limiting range; command a shift from the current operating range to a non-limiting range; and operably shift the transmission from the current operating range to the non-limiting range.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The terminology used herein is for the purpose of describing particular illustrative embodiments only and is not intended to be limiting. As used herein, the singular forms "a", "an" and "the" may be intended to include the plural forms as well, unless the context clearly indicates otherwise. Similarly, plural forms may have been used to describe particular illustrative embodiments when singular forms would be applicable as well. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
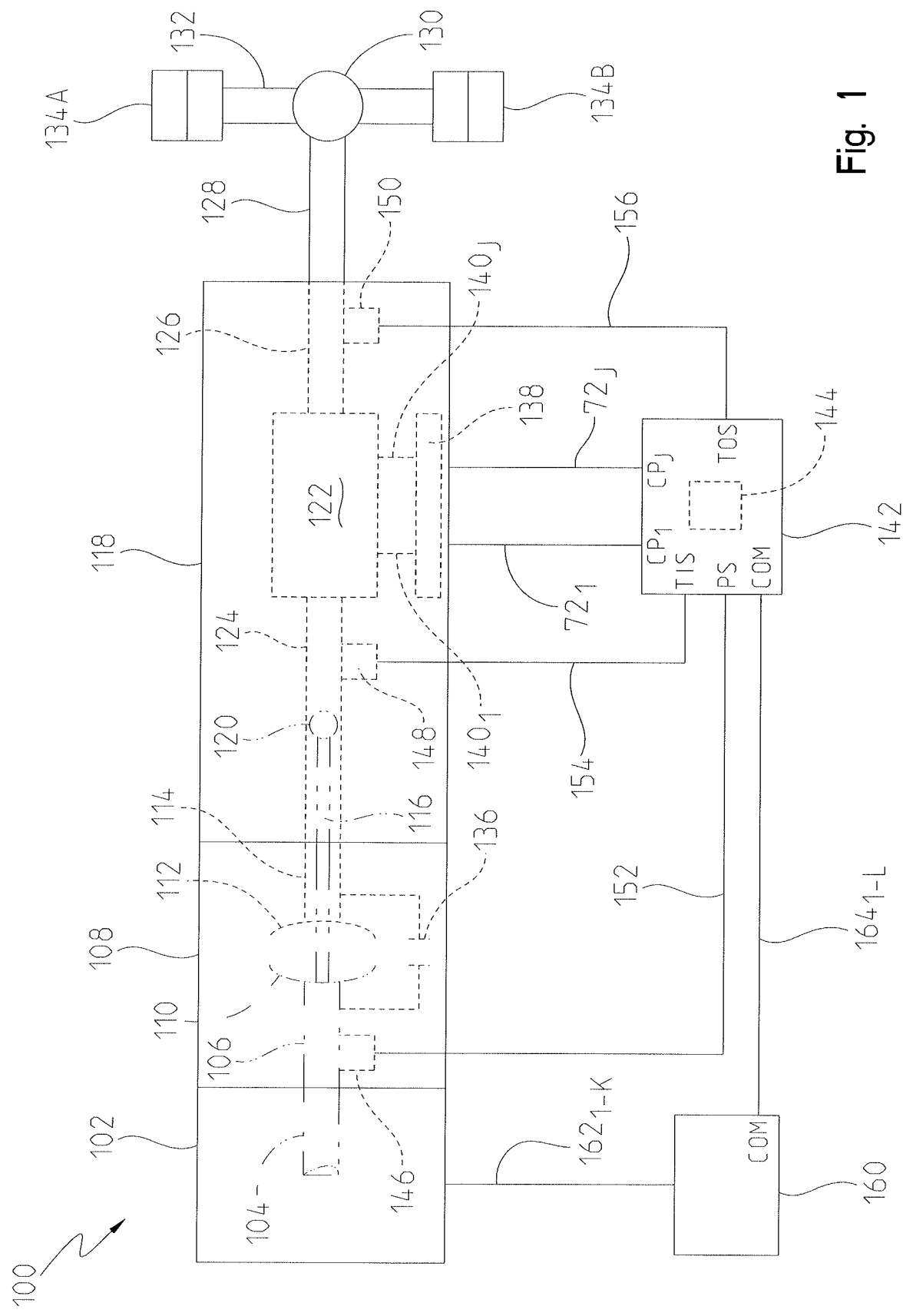
FIG. 1 is a block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to more torque than is being supplied by the drive unit 102, as is known in the art. The torque converter 108 is alternatively operable in a so-called "lockup" mode during other operating conditions, such as when torque multiplication is not needed. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed and direction of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system 138 in a conventional manner. For example, the electro-hydraulic system 138 illustratively includes a conventional hydraulic positive displacement pump 120 which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a datalink. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a Society of Automotive Engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

In many conventional control systems, a transmission controller circuit 142 (i.e., transmission controller) may communicate with the drive unit control circuit 160, or often referred to as the engine controller, and send default torque limits for the engine controller to remember in the event of a loss of communication. For example, in a stall condition, the transmission controller may send a torque limit to the engine controller to control output torque. If the communication link goes down, however, the transmission controller is unable to send these messages.

In at least some transmissions, each range has the same turbine torque limit. In other words, due to the transmission architecture and hardware assembled to make up the transmission, the transmission controller may communicate a single torque limit to the engine in the event of a loss of communication therebetween. In some instances, the engine controller may be programmed to automatically lower engine torque in the event of a loss of communication with the transmission controller.

In at least one instance, however, a transmission may be designed such that not every range is designed to have the same turbine torque limit. In this instance, at least one range may have a turbine torque limit that is lower than the other ranges. This may be due to hardware limitations and the like. In any event, the transmission controller communicates the turbine torque limit of each range to the engine controller, but not all engines may be able to integrate with the transmission controller to support the lower turbine torque limit. In this case, there is a potential for an issue if the transmission is in a certain range that requires a lower turbine torque and the engine is unable to meet this requirement. Thus, it is desired to avoid these aforementioned instances and instead be able to control the impact on the transmission without resorting to communications between the transmission and engine controllers.

Figure 2:
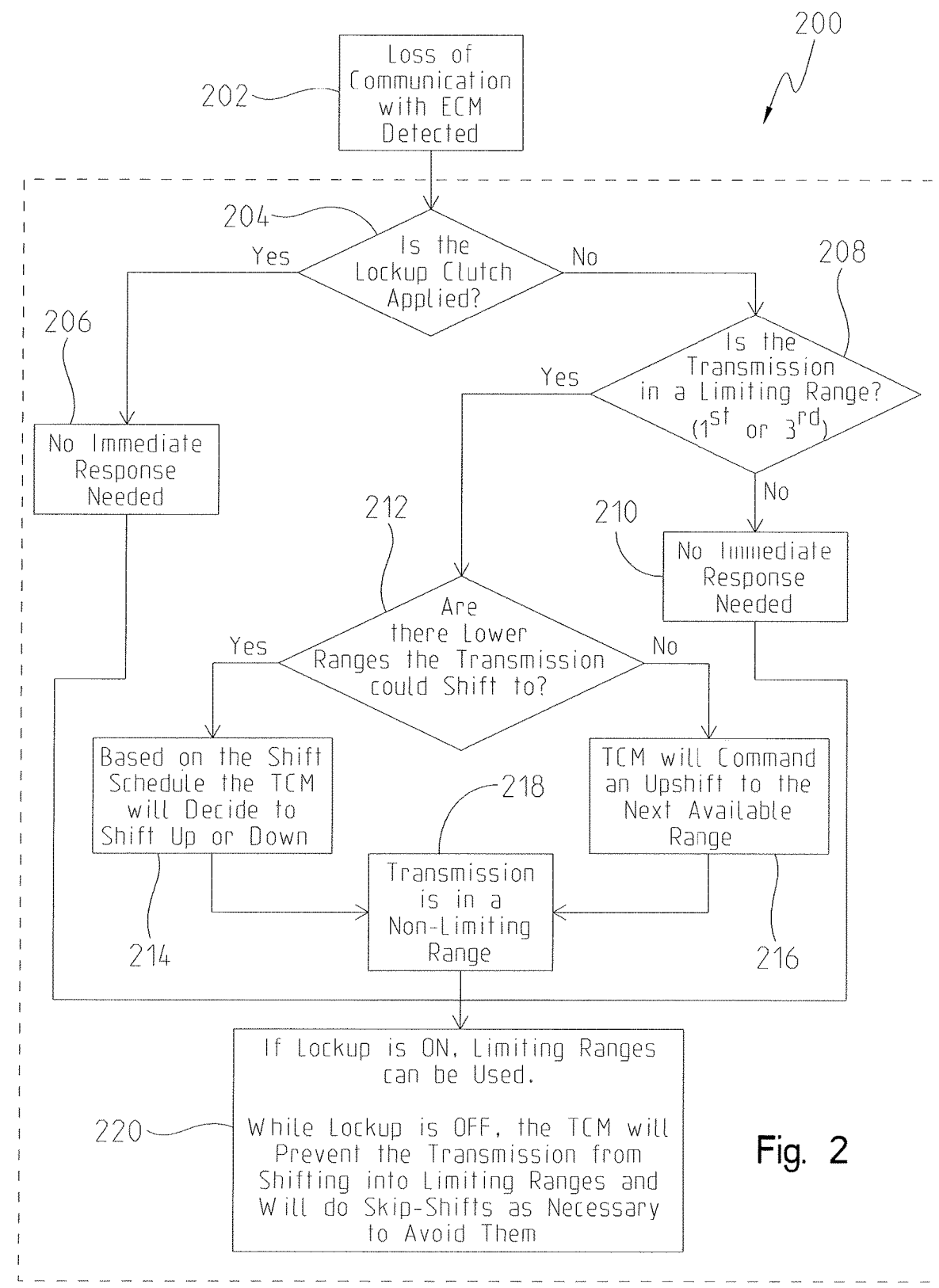
FIG. 2 is a flow diagram of a first method of controlling transmission range in response to a loss of communication with an engine.

Referring to FIG. 2, a plurality of blocks or steps are provided for executing a control process or method 200 by the transmission controller to control range shifting in the event of a loss of communication over the datalink. Datalink communication may get interrupted or lost due to a variety of issues. For example, if the wires between the transmission controller and the engine controller malfunction, are cut, or any other wiring issue, then communication may be lost. Moreover, if water, for example, gets into a connector and shorts the connection then communication can be affected. Further, one of the controllers may get damaged or malfunction such that it sends incorrect messages over the datalink, then it may be determined that communication is lost. While this may primarily include the transmission and engine controllers, other controllers that communicate over the datalink may be affected by a loss of communication.

In method 200, the controller (i.e., transmission control circuit 142) may execute a first block 202 in which it detects a loss of communication with the engine controller (i.e., drive unit control circuit 160). The manner in which this block is performed may depend upon the type of messages being sent or received. For instance, if a message is indeterminable then the transmission controller may determine that communication is lost.

In another example, the transmission controller may attempt to receive one or more messages over the datalink, and if the controller detects a timeout condition on a particular message it is trying to receive, the controller may implement a fault counter. If a certain number of samples (e.g., 500 samples) out of a threshold number of samples (e.g., 600 samples) fail, then a diagnostic may be triggered.

In a further example, an additional intermittent diagnostic check may be implemented where if a number of samples (e.g., 15 samples) out of a threshold number of samples (e.g., 600 samples) fail, an intermittent fail counter is incremented. If the counter exceeds another threshold number (e.g., 18 counts) in a key cycle, an intermittent fault may be set.

Each of the aforementioned examples are not intended to be limiting, but rather introduce different ways a transmission controller may detect if communication is lost. Other conventional ways may be used as well.

If the loss of communication is detected by the controller in block 202, an algorithm executable by the controller may be enabled or triggered to control transmission range. The algorithm may be enabled in order to allow the transmission controller to monitor the range in which the transmission is currently operating in and limit or inhibit the transmission from shifting into one or more ranges. To do so, the transmission controller may execute a first block 204 in which a determination is made whether the lockup clutch 136 is applied. The lockup clutch 136 may only be applied in a certain number of ranges. In any event, if it is determined that the lockup clutch 136 is applied, then the process 200 may advance to block 206 in which the controller does not take any immediate action.

Moreover, after block 206, the process 200 may advance to block 220. Here, if the lockup clutch 136 is applied, then the controller may be programmed to use one more or ranges.

In the event the lockup clutch is not engaged, then the process 200 may advance from block 204 to block 208. In block 208, the controller is able to detect if the vehicle is either moving or stationary, and if moving, then in what range the transmission is presently operating. The algorithm may define one or more ranges as being operational ranges and one or more ranges as being limiting ranges. In one example, the transmission may include nine or more forward ranges, and only first range and third range are predefined as limiting ranges. The other seven forward ranges may be predefined as operation ranges. In block 208, the controller determines if the transmission is currently in an operational range or a limiting range. If, in block 208, it is determined that the transmission is operating in an operational range and not a limiting range, the process 200 may advance to block 210. If, on the other hand, the transmission is operating in a limiting range, then the process 200 advances to block 212.

In block 210, the transmission controller has determined that the transmission is not currently operating in a limiting range, and thus it is not operating in range that requires a lower turbine torque. As such, the transmission controller can continue to allow the transmission to function in its current range without taking any action.

If, in block 210, it is determined that the transmission is operating in a limit range, then the transmission controller executes block 212 by determining if there is a lower range to which the transmission can be shifted. In the above example, if the transmission is operating in third range and it is possible to downshift to second range, which is an operational range, then the process 200 advances to block 214. If, however, in block 212 it is determined that there is no lower range to shift into, then the process 200 advances to block 216 where the controller commands an upshift to the next available range. For example, if the transmission is operating in first range, then the transmission controller can command an upshift to second range, which in this example is not a limiting range.

In block 214, if the transmission is functioning in a limiting range and there is a lower range available to shift to that is not another limiting range, then the transmission controller may command a downshift or an upshift based on a shift schedule stored in the memory unit of the controller. For example, the controller may determine if a downshift will cause the engine to overspeed. An overspeed threshold, for instance, may be stored by the controller or communicated to the controller in a software, algorithm, or the like. Moreover, the controller may prevent an upshift if doing so will pull the engine speed below a minimum engine speed threshold for a given range. Thus, whether the transmission controller decides to upshift or downshift may be based on engine speed and output speed.

Once the transmission is operating in an operational range and not a limiting range, the controller may control shifts to avoid the limiting range(s). To do so, the controller may cause an upshift or downshift to skip all of the limiting ranges. Thus, if operating in second range in the previous example and the vehicle operator desires to upshift, the transmission controller may command a shift from second range to fourth range to avoid the limiting range of third range. Similarly, if operating in fourth range and the operator desires to downshift, the transmission controller may operably command the transmission to skip third range and shift to second range.

While this example describes first and third ranges as being limiting ranges, it is contemplated in this disclosure that any range or ranges may be a limiting range. For purposes of this disclosure, a limiting range may be defined as a range having a lower torque capacity or torque rating compared to the other ranges. As noted above, the lower torque capacity or rating may be due to hardware limitations with respect to the transmission in the given limiting range. In some instances, the torque capacity of a limiting range may be a factor or two lower than the torque capacity of the operational ranges. Moreover, the transmission controller may be programmed with limiting ranges. This may occur at the factory or after leaving the factory.

In another embodiment, the transmission controller may simply lock the transmission into an operational range and not allow it to shift to another range. In other words, the transmission controller may not execute skip shifts or the like to avoid limiting ranges. This, however, is less desirable than the control logic of FIG. 2.

A further embodiment may include requiring the engine controller to reduce the engine torque to a level below the torque limits in a given range. This, of course, is not as desirable as the process 200 of FIG. 2 because a lack of communication between the transmission controller and engine controller over the datalink makes it difficult to execute this embodiment.

Figure 3:
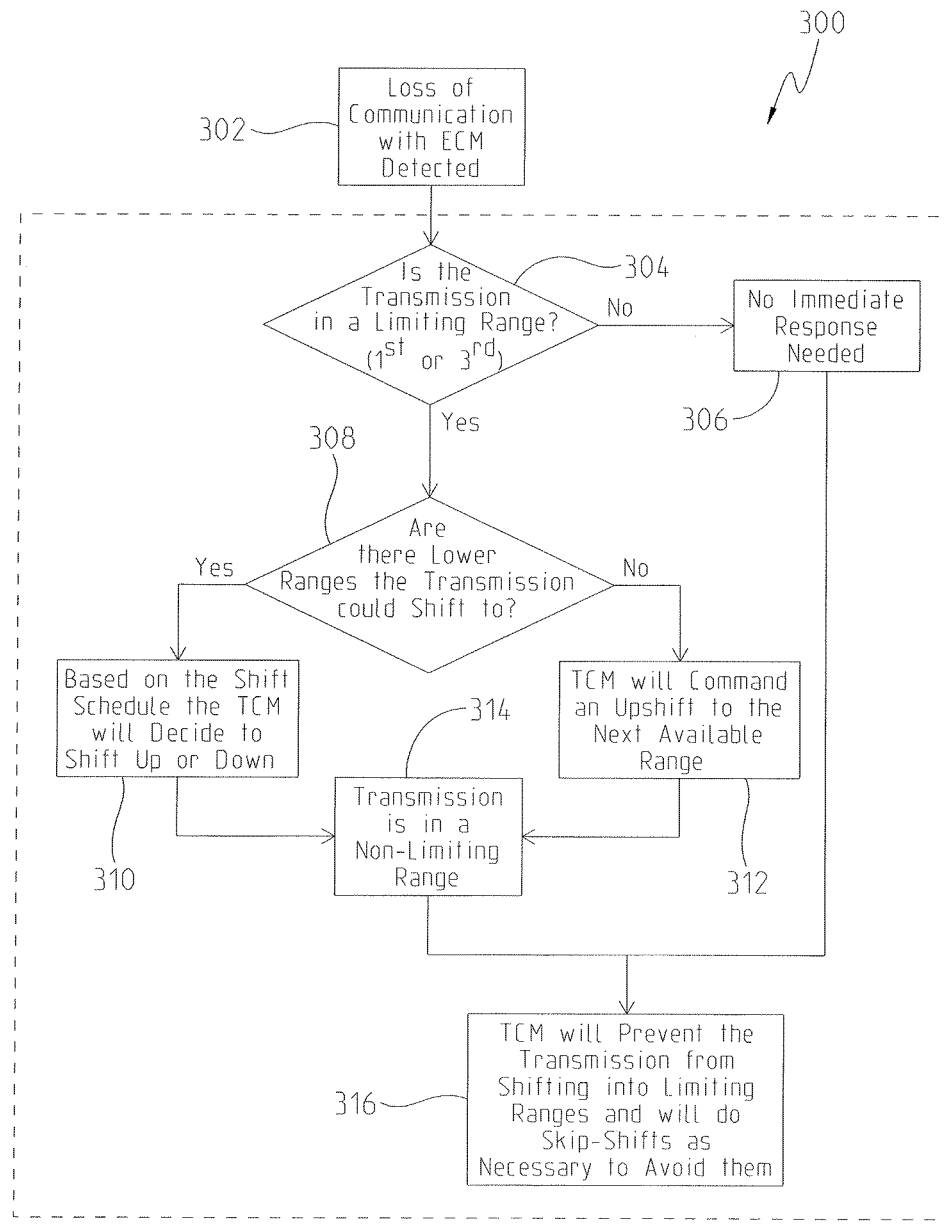
FIG. 3 is a flow diagram of a second method of controlling transmission range in response to a loss of communication with an engine.

Turning to FIG. 3, a different embodiment of a control method or process is illustrated for controlling transmission range in the event of a loss of communication with the engine controller. In this process 300, the transmission controller may detect if there is a loss of communication with the engine controller in block 302. If there is a loss detected in block 302, then the control process 300 may advance to block 304 where the transmission controller determines if the transmission is operating in a limiting range or an operational range. For purposes of this example, we will assume the transmission has at least nine forward ranges in which first range and third range are limiting ranges, and the other forward ranges are operational ranges.

In block 304, the controller determines the current range based on a current gear ratio, which may be computed according to any known manner (i.e., comparing transmission output speed to transmission input speed). If the current range is a limiting range, then the control process 300 advances to block 308. If, however, the current range is not a limiting range, but rather it is an operational range, then the control process advances to block 306 where no immediate action is necessary.

If the control process 300, however, advances to block 308, the transmission controller determines if there is a lower range to which the transmission can be shifted without shifting into a limiting range. For instance, in our present example, if the transmission is operating in third range, then the transmission controller can determine that it is safe to downshift to second range, which is an operational range. Thus, the controller may command a downshift to second range. Alternatively, the transmission controller may also determine in block 310 if it is better to upshift to a different operational range, i.e., fourth range in this example. In the previous embodiment of FIG. 2, a list of criteria including engine speed and output speed may be used in conjunction with a shift schedule to guide the controller in determining whether to upshift or downshift. Once the transmission upshifts or downshifts in block 310, the process 300 advances to block 314 where the transmission is allowed to operate in a non-limiting range.

If, in block 308, it is determined that the transmission cannot be downshifted to a non-operational range, then the process 300 advances to block 312 where the transmission controller commands an upshift from a limiting range to a non-limiting range. For example, if the transmission is operating in first range, which is a limiting range, then the controller may command an upshift to second range. The upshift command may be communicated in block 312 such that in block 314 the transmission is functioning in a non-limiting range.

In block 316, the transmission controller can inhibit or prevent the transmission from shifting into a limiting range so long as communication is lost. The controller may initiate skip shifts and the like to avoid shifting into a limiting range. Alternatively, the controller may lock the transmission into a non-limiting range and not allow any further shifting until communication is restored.

It is worth noting that for purposes of this disclosure, the control processes 200, 300 that are executed during a loss of communication between the transmission controller and engine controller are different than the fail-safe or limp home modes that accompany a complete loss of electrical power. In the latter, the complete loss of electrical power results in the transmission controller unable to energize solenoids and the entire electrical control system is disabled. When designing control systems in the event of a complete power loss, the control system may include conventional normally high and normally low solenoids which dictate pre-defined default ranges the transmission shifts into when power is lost. These pre-defined default ranges allow the transmission to still function in a limp home or fail-safe mode.

In the present disclosure, however, electrical power is not completely lost. Instead, datalink communication between the transmission controller and engine controller is interrupted or disabled, but other components on the J-1939 link may still communicate with one another. Moreover, the transmission controller can still energize and de-energize solenoids to induce the transmission to shift into a desired range. In other words, the transmission controller can still operably control the transmission to shift to different ranges even when there is a loss of communication over the datalink, but communication between the transmission controller and the engine controller is disrupted.

In the event communication is restored or regained when the control process 200 or 300 is being executed, the respective control process may be exited. The transmission control logic may determine if a shift out of a limiting range was a result of the loss of communication, then when communication is restored the transmission controller may shift back to the limiting range.

Alternatively, the transmission controller may consider the shift schedule and determine if the transmission is to remain in its current range or shift to another range once communication is restored. For example, if the shift lines in the shift schedule dictate to shift from fourth range to third range, then the controller may follow the guidance of the shift schedule. Further, normal control logic that is based on shift speeds and the like may determine whether to shift back to a limiting range. Other control logic may consider engine torque, other algorithms, most effective transmission mode, etc. when determining which range the transmission should operate in once communication is restored.

In most instances, once communication is restored and the algorithm is exited, the transmission controller may return to normal operation and control transmission shifting based on a current shift schedule.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of controlling a multispeed transmission, comprising:
   providing a transmission controller, a plurality of ranges of the transmission of which at least one of the plurality of ranges is defined as a limiting range, and a communication link;
   operating the transmission in a first range of the plurality of ranges;
   detecting a loss of communication over the communication link between the transmission controller and another controller;
   determining if the first range is a limiting range;
   commanding by the transmission controller a shift from the first range to a second range of the plurality of ranges if the first range is a limiting range and the second range is a non-limiting range; and
   shifting the transmission from the first range to the second range.

2. The method of claim 1, further comprising preventing by the transmission controller a shift from any of the plurality of ranges not defined as the limiting range to the at least one of the plurality of ranges defined as the limiting range.

3. The method of claim 1, further comprising maintaining the transmission in first range if the first range is not a limiting range.

4. The method of claim 1, further comprising performing a skip shift by shifting from second range to a third range, where first range is between the second and third ranges.

5. The method of claim 1, further comprising determining if there is a lower range to downshift to that is not a limiting range.

6. The method of claim 5, further comprising upshifting to a higher, non-limiting range when the first range is a limiting range and there is no lower, non-limiting range.

7. The method of claim 5, further comprising upshifting or downshifting from first range to a non-limiting range based on a shift schedule when there is a lower, non-limiting range available to shift to.

8. The method of claim 7, further comprising avoiding overspeeding an engine by upshifting based on the shift schedule.

9. The method of claim 1, further comprising maintaining the transmission in a non-limiting range after the shifting step until communication is restored.

10. The method of claim 1, further comprising:
    detecting communication between the transmission controller and the other controller via the communication link is restored; and
    resuming normal operation of the transmission.

11. The method of claim 10, wherein the resuming step comprises shifting from the second range to the first range.

12. The method of claim 1, wherein the detecting step comprises:
    detecting a timeout condition by the transmission controller when receiving a message via the communication link from the other controller;
    implementing a counter upon detecting the timeout condition; and
    triggering a diagnostic code if a number of samples detected via the implementing step exceeds a sample threshold.

13. The method of claim 12, further comprising enabling an algorithm to perform the determining step, commanding step and shifting step if the number of samples exceeds the sample threshold.

14. The method of claim 1, further comprising determining if a lockup clutch of the transmission is engaged after the detecting step.

15. The method of claim 14, further comprising:
    shifting out of first range if the lockup clutch is not engaged; and
    controlling the transmission in first range or any of the plurality of ranges if the lockup clutch is engaged.

16. A method of controlling a multispeed transmission of a vehicle having an engine, comprising:
    providing the transmission with a transmission controller for controlling the transmission, a lockup clutch, and a plurality of shiftable ranges, where each of the plurality of shiftable ranges comprises a torque limit;

defining each of the plurality of shiftable ranges as either a limiting range or a non-limiting range based on its respective torque limit, where each limiting range has a lower torque limit than the non-limiting ranges;

operating the transmission according to a shift schedule in a first range of the plurality of ranges, where the first range is defined as a limiting range;

detecting a loss of communication over a communication link between the transmission controller and another controller;

determining if the lockup clutch is engaged or disengaged;

commanding by the transmission controller a shift from the first range to a second range, where the second range is defined as a non-limiting range; and controlling the transmission by the transmission controller to shift from the first range to the second range.

17. The method of claim 16, further comprising preventing by the transmission controller a shift from one of the non-limiting ranges to one of the limiting ranges until communication is restored.

18. The method of claim 16, further comprising:
determining if there is a lower, non-limiting range to downshift the transmission; and
upshifting to a higher, non-limiting range from the first range when there is no lower, non-limiting range.

19. The method of claim 18, further comprising upshifting or downshifting from first range to a non-limiting range based on the shift schedule when there is a lower, non-limiting range available to downshift to.

20. A multispeed transmission, comprising:
a transmission having an input and an output, the input configured to be operably coupled to an engine;
a plurality of shiftable ranges of the transmission, where each of the plurality of shiftable ranges comprises its own torque limit; and
a transmission controller comprising a memory unit and a processor, the memory unit storing a shift schedule for operably controlling the transmission;
wherein, each of the plurality of shiftable ranges is defined as either a limiting range or a non-limiting range based on its torque limit, where the torque limit of the limiting range is less than the torque limit of the non-limiting range;
wherein, the transmission controller is configured to be disposed in electrical communication with an engine controller via a communication link;
further wherein, a set of instructions are executable by the processor of the transmission controller to:
detect a loss of communication with the engine controller over the communication link;
determine if a current operating range of the transmission is a limiting range;
command a shift from the current operating range to a non-limiting range; and
operably shift the transmission from the current operating range to the non-limiting range.

* * * * *